Sept. 2, 1958 E. C. LOWE 2,849,860
ROCKET MOTOR WITH RECRYSTALLIZED SILICON
CARBIDE THROAT INSERT
Filed Oct. 17, 1955
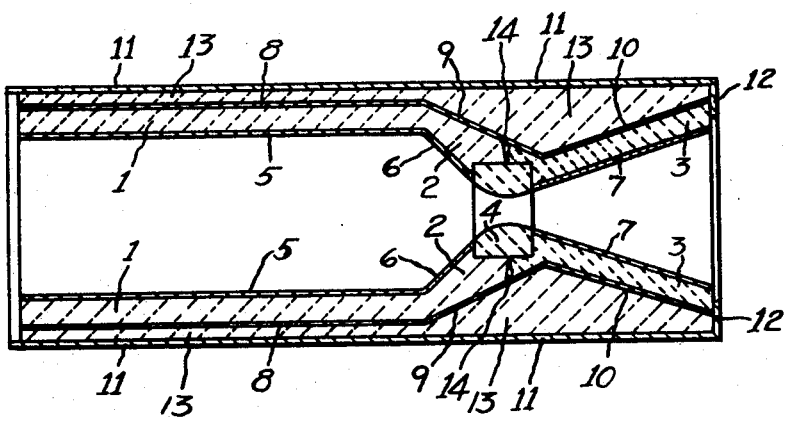
INVENTOR.
EDWIN C. LOWE
BY
ATTORNEY

2,849,860

ROCKET MOTOR WITH RECRYSTALLIZED SILICON CARBIDE THROAT INSERT

Edwin C. Lowe, Niagara Falls, Ontario, Canada, assignor to Norton Company, Worcester, Mass., a corporation of Massachusetts Application October 17, 1955, Serial No. 540,962

6 Claims. (Cl. 60—35.6)

The invention relates to rocket motors, particularly to the combustion chamber and exhaust nozzle therefor.

One object of the invention is to provide a rocket motor chamber and nozzle which are highly refractory but light in weight together with a nozzle throat which is still more resistant to high velocity flame. Another object of the invention is to provide a combustion chamber nozzle and throat in an integral piece but conveniently made up from three pieces.

Other objects will be in part obvious or in part pointed out hereinafter.

In the accompanying drawing the single figure is an axial sectional view of a rocket motor constructed in accordance with the invention.

For the manufacture of my rocket motor I machine out of graphite a hollow cylindrical chamber 1, having a portion of a venturi 2 as an integral part thereof. Rocket engineers consider that the combustion chamber is the enclosure where the combustion takes place to the narrowest part of the venturi commonly called the throat, so therefore parts 1 and 2 form the combustion chamber in this sense. I further machine an exhaust nozzle piece 3 out of graphite which, together with the throat insert 4, completes the venturi. The combustion chamber and nozzle thus may consist originally of only three pieces, since as indicated the parts 1 and 2 are preferably formed in an integral piece.

As illustrated herein the portion 2 is cut away on the inside to form a space for part of the insert 4 and the exhaust nozzle piece 3 is cut away on the inside to make a space for the remainder of the throat insert 4. However, the dividing line between the portion 2 and the exhaust nozzle piece 3 may be other than exactly at the throat as illustrated and therefore the insert 4 might be entirely in the portion 2 or might be entirely in the piece 3.

A particular feature of this invention is the use of recrystallized silicon carbide for the throat insert 4. This material is now well known and formation thereof is described in U. S. Letters Patent to Francis A. J. Fitzgerald No. 650,235 granted May 22, 1900 and in numerous other later patents. Recrystallized silicon carbide is highly resistant to flame especially if the flame be non-oxidizing as in the case with the reaction blast from a rocket motor. Recrystallized silicon carbide can withstand for a long time temperatures as high as about 2250° C. and for a short time can withstand even higher temperatures. The flame temperature reached during the combustion of some rocket motor fuels has been estimated to be as high as 2700° C. and that brings out another feature of the recrystallized silicon carbide throat insert according to my invention in that the high thermal conductivity thereof so rapidly dissipates the heat that it is able to withstand a flame temperature higher than its decomposition temperature during the normal flight of rockets used for guided missiles. Recrystallized silicon carbide is also extremely erosion resistant and the use thereof insures that no undue wear occurs at this vital spot.

The following procedure is the best one now known to me for the manufacture of the inserts 4.

On the inside of the chamber 1 including the inside of the portion 2, I formed a coating of silicon carbide 5 and 6 integral with the graphite and the coatings 5 and 6 were integral with each other. On the inside of the exhaust nozzle piece 3 I likewise formed a coating 7 of silicon carbide. On the outside of the chamber, including the outside of the portion 2, I formed a coating of silicon carbide 8 and 9 integral with the graphite and the coatings 8 and 9 were integral with each other. On the outside of the exhaust nozzle piece 3 I formed a coating of silicon carbide 10 and this coating was integral with the graphite and also with the coating 9. It will be seen that in this manner the various portions of the rocket chamber and complete venturi including nozzle were secured together as one piece despite the fact that they were originally made in three pieces or it might be four or even more. This greatly facilitated manufacturing of the rocket motor while giving at the same time the advantage of rigidity thereof.

The use of a chamber and a nozzle made of graphite insures relatively light weight which is of course a very important factor in rocket motors. The bulk specific gravity of graphite ranges from about 1.6 to about 1.9 whereas the specific gravity of silicon nitride bonded silicon carbide which has been proposed is around 2.6. Other silicon carbide chambers which have been proposed and used have a comparable bulk specific gravity, that is close to the nitride bonded material mentioned. The thermal conductivity of graphite takes the heat away from the inside silicon carbide coatings 5, 6 and 7 so that they are not decomposed or in any event will last sufficiently long to achieve the desired purpose. In this connection it doesn't make too much difference in the case of rocket missiles used only once whether the chamber 1 grows during flight provided there is something left right up to the moment the charge is exhausted. The hottest place is at the throat because from there on expansion occurs but at the throat, the gases are compressed by the venturi action and at this point the very refractory and thermally resistant but also thermally conductive recrystallized silicon carbide is provided. Graphite itself will withstand temperatures in excess of 3000 C. in a suitable atmosphere without vaporizing or otherwise disintegrating. Graphite is not, however, erosion resistant, whereas the silicon carbide coatings and the recrystallized silicon carbide are highly erosion resistant.

Although the silicon carbide coatings are permeable, they are less permeable than the graphite. In various rocket motor designs the escape of the gases into the chamber wall is desirable but is variable, the optimum being a certain rate for one design and a different rate for another design. This points up another advantage of the present invention in that by increasing or decreasing the thickness of the coatings 5 and 6 different rates of penetration of the gases can be achieved. Usually the coating 7 should be as reasonably thick as possible consistent with lightness in weight because the desirability of permeability into the exhaust nozzle has not been established and there the gases are expanding due to the venturi shape so there would seem to be little advantage in having penetration there and furthermore the pressure is much lower once the gases have passed the throat strictly speaking. Also it is the pressure against the exhaust nozzle being the inside of the venturi which gives a large part of the thrust that propels the rocket.

The chamber 1 including the portion 2 and the nozzle 3 are enclosed in a metal shell 11, usually made of steel, which is in the form of a hollow cylinder with a lip 12.

This is large enough around the chamber 1 to leave a space between the coating 8 and the shell 11 and a larger space which may be as indicated between the shell 11 and the coating 9 and the coating 10. This space is filled with refractory material 13 which should be light in weight and highly refractory. It should be thermally insulating in order to protect the metal shell 11. An excellent material for this purpose is alumina in the form of a cement slip which can be poured into place. The alumina cement can be a cold setting cement with water to make the slip which evaporates during setting. The cement, however, should be porous in order to achieve minimum bulk specific gravity. Plaster of Paris and many cements are known and could be used but that is a matter apart from my invention.

I have already pointed out that the silicon carbide coatings 8, 9 and 10 on the outside of the chamber and the nozzle are continuous and integral with each other. This coating thus serves to join the portion 2 to the nozzle piece 3. However, for greater strength I may provide an annular joint space (and there are many varieties) between the portion 2 and the nozzle piece 3 and the silicon carbide will fill this space forming a union 14 of silicon carbide for extra strength.

The thickness of the coatings can vary between 0.001 inch and 0.125 inch. Usual thickness range is 0.002 inch to 0.010 inch which has been found as satisfactory for coatings 5, 6, 7, 8, 9 and 10. Having given general directions for the thickness of coatings for many practical rockets now known, I should not be limited to any specific dimensions.

It will thus be seen that there has been provided by this invention a rocket motor in accordance with which the various objects hereinabove set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:

1. A rocket motor comprising a hollow chamber made of graphite having a portion of a venturi as an integral part thereof, an exhaust nozzle piece separate from said chamber and also made of graphite and constituting a continuation of said venturi, a throat insert made of recrystallized silicon carbide in the narrowest part of said venturi, a coating of silicon carbide on the inside of said chamber and on the inside of the said portion of a venturi being a continuous coating and being integral with the graphite of said chamber and of said portion of a venturi, a coating of silicon carbide on the inside of said exhaust nozzle piece and being integral with the graphite thereof, and a continuous outside coating of silicon carbide on the outside of the chamber and the portion of a venturi and the exhaust nozzle piece and integral with the graphite of said chamber and of said portion of a venturi and of said exhaust nozzle piece.

2. A rocket motor according to claim 1 having an annular union of silicon carbide between the portion of the venturi and the exhaust nozzle piece and integral with the graphite of each thereof said union adding strength to said rocket motor.

3. A rocket motor comprising a graphite combustion chamber, a graphite exhaust nozzle, a recrystallized silicon carbide throat insert between the chamber and the nozzle, said throat insert and said nozzle forming at least part of a venturi and the narrowest part of the venturi being in the throat insert, a coating of silicon carbide on the inside of said chamber integral with the graphite thereof, and a coating of silicon carbide on the inside of said exhaust nozzle integral with the graphite thereof.

4. A rocket motor according to claim 3 having a continuous coating of silicon carbide on the outside of the combustion chamber and on the outside of the exhaust nozzle and being integral with the graphite of the chamber and of the nozzle.

5. A rocket motor according to claim 4 having an annular union of silicon carbide between the combustion chamber and the exhaust nozzle and integral with the graphite of each thereof.

6. A rocket motor according to claim 3 having an annular union of silicon carbide between the combustion chamber and the exhaust nozzle and integral with the graphite of each thereof.

References Cited in the file of this patent

UNITED STATES PATENTS

| | | |
|---|---|---|
| 2,555,080 | Goddard | May 29, 1951 |
| 2,614,619 | Fuller | Oct. 21, 1952 |
| 2,658,332 | Nicholson | Nov. 10, 1953 |
| 2,699,036 | Nicholson | Jan. 11, 1955 |

FOREIGN PATENTS

| | | |
|---|---|---|
| 465,731 | Canada | June 6, 1950 |
| 1,009,482 | France | Mar. 12, 1952 |